United States Patent [19]
Thompson

[11] Patent Number: 5,239,396
[45] Date of Patent: Aug. 24, 1993

[54] SAFETY APPLICATION OF HOLOGRAPHIC MATERIAL

[76] Inventor: Marion E. Thompson, 2805 N. Prospect, Colorado Springs, Colo. 80907

[21] Appl. No.: 840,924

[22] Filed: Feb. 25, 1992

Related U.S. Application Data

[63] Continuation-in-part of Ser. No. 711,135, Jun. 6, 1991.

[51] Int. Cl.⁵ .............................. G02B 5/32; G03H 1/00
[52] U.S. Cl. .......................................... 359/1; 359/522; 359/523
[58] Field of Search ................. 359/1, 2, 24, 520, 522, 359/523; 283/86; 40/594

[56] References Cited

U.S. PATENT DOCUMENTS

| | | | |
|---|---|---|---|
| 4,681,324 | 7/1987 | Karabed et al. | 359/1 |
| 4,838,965 | 6/1989 | Bussard | 359/1 |
| 4,878,719 | 11/1989 | Wreede et al. | 359/24 |
| 4,893,887 | 1/1990 | Coates | 359/1 |
| 4,913,504 | 4/1990 | Gallagher | 359/2 |
| 4,947,299 | 8/1990 | Lin | 359/1 |

*Primary Examiner*—Martin Lerner
*Attorney, Agent, or Firm*—Nixon & Vanderhye

[57] ABSTRACT

A holographic diffraction media is disposed on a physical object in a highly visible position so as to enhance the human visibility of the object, and therefore the safety of humans using or associated with the object. The media may be a piece of thin plastic (polyester) film with an adhesive backing, with a release paper that is removed when it is desired to attach the film to the object. The object may be a road marker, road sign, a paved road itself (i. e. the holographic media may be a lane divider or a side strip for the road), a spoked wheel, a tire with a hubcap or wheel cover, a propeller, a safety vest, or a jogging shoe (affixed to the upper heel exterior of the shoe). The holographic diffraction media is inexpensive, light weight, and is more visible in environments with low and/or diffuse light than are reflectors.

9 Claims, 2 Drawing Sheets

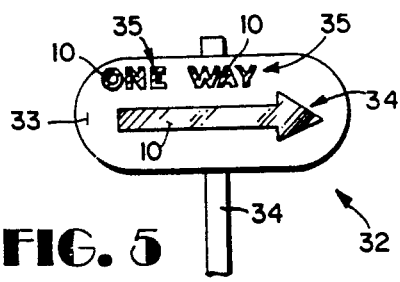
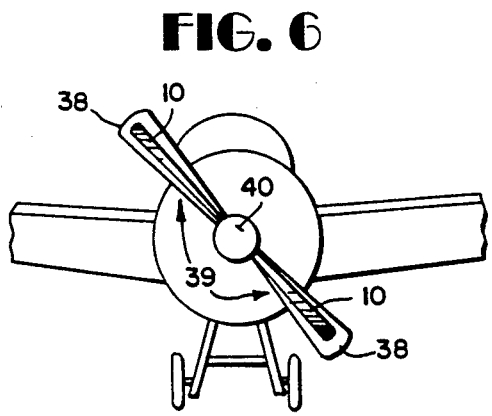
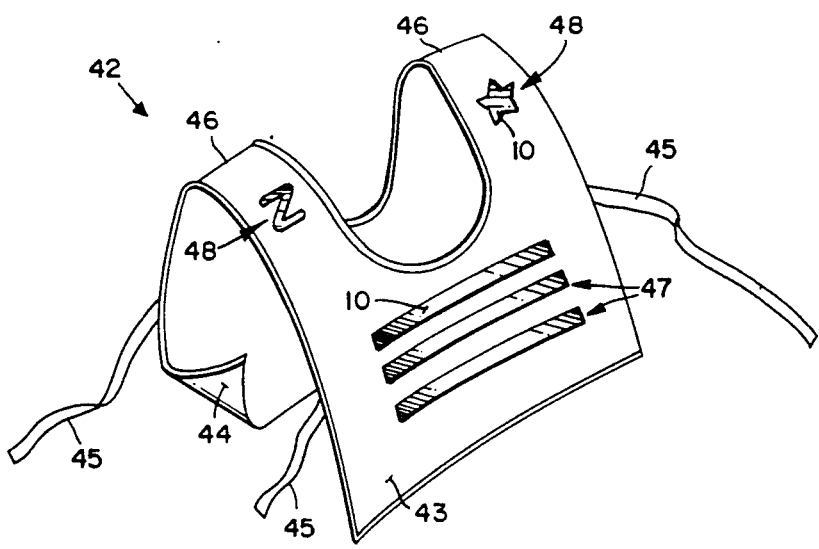
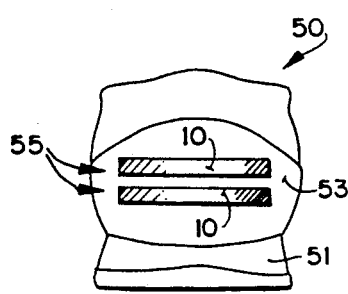
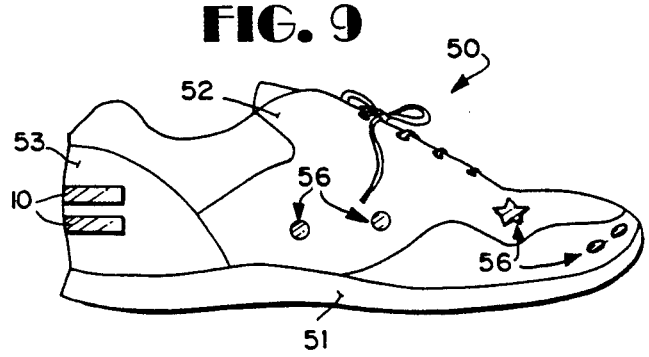

SAFETY APPLICATION OF HOLOGRAPHIC MATERIAL

RELATED APPLICATIONS

This application is a continuation-in-part of application Ser. No. 07/711,135 filed Jun. 6, 1991, the disclosure of which is hereby incorporated by reference herein.

BACKGROUND AND SUMMARY OF THE INVENTION

There are many different environments in which it is highly desirable to enhance the visibility to humans of an object, in order to thereby enhance human safety of those utilizing or associated with the object. Some general examples are enhancing the visibility of motor vehicles, bicycles and motorcycles, airplane propellers, road markers, road signs, road markings, safety vests, and jogging shoes. Typically, visibility is enhanced by providing some sort of a reflector associated with these objects. However reflecting media oftentimes do not provide sufficient visibility in low and/or diffuse light environments, in many environments they are relatively heavy, and they are often relatively expensive.

For example, plastic reflectors are typically used on bicycle and motorcycle spoked wheels. Plastic reflectors require an intense direct light in order to provide sufficient visibility for good safety, are relatively heavy (enough to make some bicycle wheels out of balance), and are relatively expensive.

Reflective tape that is applied to the backs of jogging shoes, and to safety vests, while not having the drawback of relatively high weight, like plastic bicycle reflectors require a relatively intense direct light in order to provide good visibility, such as the head lights of an oncoming vehicle. The same is true for the typical reflective media utilized on highway signs, and markers, and along paved roadways.

According to the present invention, it has been found that holographic diffraction media provides greatly enhanced visibility compared to reflective media for diffuse and/or low light environments. This greatly enhanced visibility makes it an excellent media to be used in association with objects where the human safety of those utilizing or associated with the objects is paramount. Typically, the holographic diffraction media is in the form of a thin plastic (e.g. polyester) film. As such, it is extremely lightweight, and very inexpensive. The thin polyester film typically has an adhesive backing, covered by a release paper, and merely by removing the release paper and adhesively securing the film to the object, or—in the case of a spoked wheel—to the adhesive backing of another piece of film on the opposite side of the spokes, one has a highly visible safety mechanism.

According to the present invention, a method, and various physical objects, are provided which greatly enhance safety in many diverse environments in a simple, and inexpensive manner, by enhancing the visibility of common objects used for safety purposes. While the invention is herein described with respect to a number of specific objects, it should be understood that the invention is applicable to all objects where enhanced visibility for safety purposes is desirable.

According to one aspect of the present invention, a method of enhancing the visibility to humans of a physical object, to thereby enhance human safety of those utilizing or associated with the object, is provided. The method comprises the step of placing at least one piece of holographic diffraction media on a portion of the object which is readily visible in use. Preferably this step is practiced by placing a thin plastic (polyester) holographic diffraction film into contact with the object, such as by adhesively securing the thin polyester film to the object. The securement is normally effected by removing a release paper covering an adhesive backing of the film, and then pressing the adhesive on the film into contact with the object.

Where the object is a spoked wheel having two side faces, the step according to the method is practiced by affixing pieces of holographic diffraction media to at least two spokes of the wheels so that the media are visible from both side faces of the wheel. This may be practiced by placing the adhesive backings of two pieces of holographic diffraction film in contact with each other with at least two spokes sandwiched between them. This affixing step is practiced in lieu of utilizing a plastic reflector on the spoked wheel.

Where the object is a tire with a hubcap or wheel cover, the step according to the invention is practiced by affixing the holographic media to the hubcap or wheel cover. Where the object is a road marker, the step is practiced by adhesively affixing the holographic media to the road marker. Where the object is a paved road, the step is practiced by affixing the holographic media to the road itself. Where the object is a road sign having warning and/or instructional indicia, the step is practiced by adhesively affixing the holographic media to the road sign as at least part of the warning or instructional indicia.

Where the object is a safety vest having exterior front and back surfaces, the step according to the invention is practiced by affixing the holographic media to the front and back exterior surfaces of the safety vest, either by stitching a holographic media film to the safety vest, or adhesively. Where the object is a shoe (such as a jogging/athletic shoe) having an upper heel exterior surface, the step according to the invention is practiced by adhesively attaching the holographic media to the shoe upper heel exterior surface. Where the object is a propeller, the holographic media is adhesively secured to the propeller.

The invention also comprises various actual physical objects with holographic diffraction media thereon, including, but not limited to, road signs, spoked wheels, and athletic shoes.

It is the primary object of the present invention to provide enhanced visibility, for safety purposes, of physical objects in a simple and inexpensive way, without adding significant weight to the objects. This and other objects of the invention will become clear from an inspection of the detailed description of the invention and from the appended claims.

BRIEF DESCRIPTION OF THE DRAWINGS

FIG. 5 is a front view of an exemplary road sign utilizing diffraction media of FIG. 1;

FIG. 6 is a front, schematic, partial view of an airplane propeller with a diffraction media of FIG. 1 associated therewith;

FIG. 7 is a perspective view of a safety vest utilizing diffraction media according to the invention;

FIG. 8 is a rear view of a jogging shoe utilizing the diffraction media of FIG. 1; and FIG. 9 is a side view of the jogging shoe of FIG. 8.

DETAILED DESCRIPTION OF THE DRAWINGS

Figure 1:
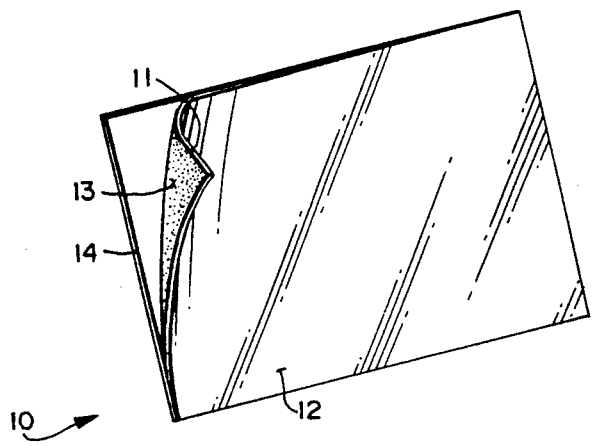
FIG. 1 is a perspective view of a piece of holographic diffraction media, in the form of a thin polyester film with adhesive backing and release paper covering, that is utilized according to the invention.

The exemplary holographic diffraction media which is utilized according to the present invention is shown generally by reference numeral 10 in FIG. 1. The holographic diffraction media piece 10 comprises a thin (e.g. 0.002 inches thick) film 11 of plastic, such as Mylar (polyester), with the holographic construction on the face 12 thereof. On the back of the film 11, opposite the holographic construction 12, preferably is a pressure sensitive adhesive coating 13, which is normally covered with a conventional release paper 14. The piece of holographic diffraction media 10 illustrated in FIG. 1 is a commercially available product which is available in almost an infinite variety of designs, providing numerous different effects, in a wide variety of different colors and patterns. One particularly useful commercially available product for this purpose is sold under the trademark "SPECTRASTAR" (such as the SPECTRASTAR "HOLLOSHEEN") by Eye Catchers of Carson, Calif.

Figure 2:
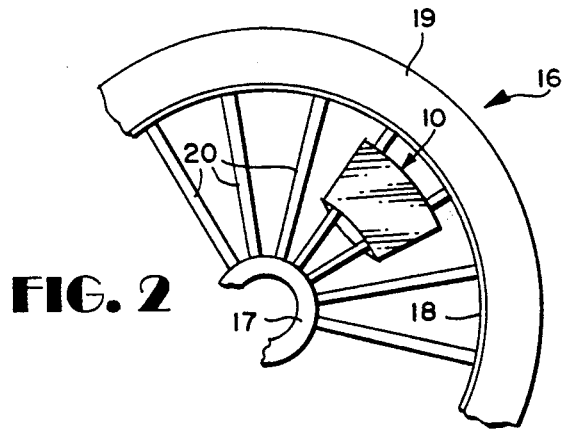
FIG. 2 is a partial perspective view of a spoked wheel utilizing the diffraction media of FIG. 1.

FIG. 2 illustrates a spoked wheel (for a bicycle or a motorcycle) 16, having a hub 17, rim 18 with tire 19, and spokes 20. Two of the diffraction media pieces 10 are adhesively secured, with their adhesive faces 13 in contact with each other, with at least two of the spokes 20 therebetween. The media 10 is so lightweight that it has no perceptible affect whatsoever on the spoked wheel 16, and is much less expensive than a conventional plastic reflector used for this purpose, and will be used in lieu of plastic reflectors.

Figure 3:
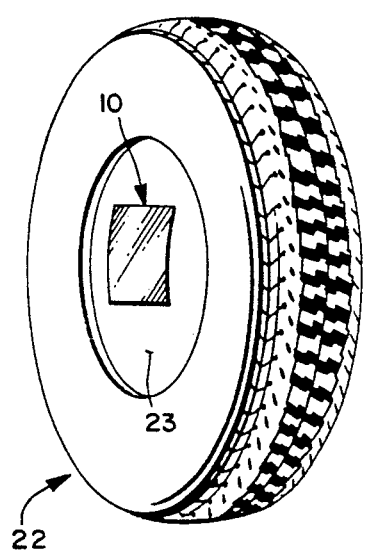
FIG. 3 is a perspective view of a tire with a hubcap utilizing the diffraction media of FIG. 1.

FIG. 3 illustrates a conventional motor vehicle (e.g. automobile or truck) tire 22 having a hubcap or wheel cover 23. A piece of diffraction media 10 according to the invention is placed on the hubcap or wheel cover 23, being adhesively secured thereto, so that it is highly visible.

In both the FIGS. 2 and 3 embodiments, where the objects 16, 22, with which the diffraction media 10 is utilized is designed to rotate, the visibility provided by the diffraction media 10 is even more remarkable than in stationary applications, providing a visual effect that is essentially impossible to miss.

Figure 4:
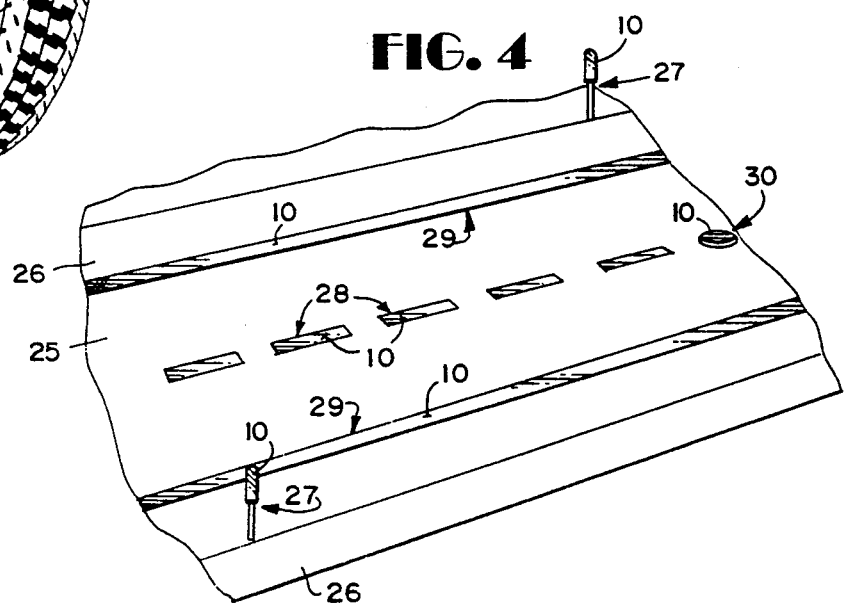
FIG. 4 is a schematic perspective view of a paved road with the diffraction media of FIG. 1 utilized at various portions thereof.

FIG. 4 is a schematic perspective view showing a conventional paved road 25, including shoulders 26, having a number of different elements associated therewith employing diffraction media 10 according to the invention. For example, on the road markers 27, diffraction media 10 is applied to the flat faces thereof. Also, the lane divider strips 28 are pieces of diffraction media 10 which may be secured to the paved roadway 25 by adhesive specially adapted to attach to asphalt, concrete, or like material of which the roadway 25 is constructed. Similarly, the shoulder stripes 29 may be of diffraction media 10, as may be raised conventional roadway level illuminators 30 having the holographic diffraction media 10 associated therewith instead of the conventional reflective media now utilized.

FIG. 5 illustrates a road sign 32, having a sign face 33 supported by a support post 34, which has enhanced visibility pursuant to the present invention. The sign face 33 has warning and/or instructional indicia, such as the non-verbal indicia (one way arrow) 34, and the writing 35. Diffraction media 10 according to the invention is adhesively secured to the plate 33, comprising one or both of the indicia elements 34, 35. For example in FIG. 5, the entire arrow 34 is formed by holographic media 10, while for the written material 35 only the "0" and "W" are shown in FIG. 5 to be of diffraction media 10 according to the present invention.

FIG. 6 illustrates the use of diffraction media 10 according to the invention adhesively secured to the blades 38 of a propeller 39. Similarly the diffraction media 10 could be applied to the hub 40 of the propeller 39.

FIG. 7 illustrates a conventional cloth safety vest 42, having a front exterior surface 43 and a rear exterior surface 44. The vest 42 typically has ties 45 to facilitate tying the vest on the user with the shoulder pieces 46 engaging the user's shoulders. Instead of conventional reflective media provided on the surfaces 43, 44, according to the present invention strips 47, and/or design elements 48, of holographic diffraction media 10 according to the present invention are provided on the surfaces 43, 44. The diffraction media 10, in the form of a film, may be stitched to the surfaces 43, 44, or applied thereto with a conventional adhesive that can attach plastic film to cloth.

FIGS. 8 and 9 illustrate a conventional jogging shoe 50. The jogging shoe 50 typically comprises a one-piece sole and heel 51, and an upper 52, including a heel exterior portion 53. It is very important in jogging shoes, and other athletic footwear, that are to be used outside at night that some sort of visibility enhancing feature be provided. It has been determined that the footwear, which is low and moving, is the most visible portion of a night time jogger, that is why conventional jogging shoes often have reflective tape applied to the upper heel exterior portion 53. Strips 55, or other designs of diffraction media 10, according to the present invention are adhesively secured to the upper heel exterior portion 53, as illustrated in FIGS. 8 and 9, and other design elements (such as circles, stars, ellipses, etc.) 56 may be adhesively secured to other portions of the upper 52 too, as illustrated in FIG. 9.

The holographic diffraction media 10 according to the present invention can be used anywhere where high human visibility is important for safety, providing greatly enhanced visibility in environments with low and/or diffuse light than reflective media, and being lightweight and inexpensive.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent methods and physical objects.

What is claimed is:

1. A method of enhancing the visibility to humans of a physical object to thereby enhance human safety of those utilizing or associated with the object, comprising the steps of placing at least one piece of holographic diffraction media on a portion of the object which is readily visible in use, and utilizing the object in a low light outdoor setting to enhance human safety in the utilization of the object, wherein the object is a spoked wheel having two side faces and wherein said placing step is practiced by affixing pieces of holographic diffraction media to at least two spokes of the wheel, so that they are visible from both side faces of the wheel.

2. A method as recited in claim 1 wherein said step is practiced by placing a thin polyester holographic diffraction film into contact with the object.

3. A method as recited in claim 2 wherein said step is further practiced by adhesively securing the thin polyester film to the object.

4. A method as recited in claim 3 wherein the thin polyester film has an adhesive backing with a release paper covering the backing, and wherein said step is practiced by removing the release paper covering the backing, then pressing the adhesive on the film into contact with the object.

5. A method as recited in claim 1 wherein the object is a spoked wheel having two side faces, and wherein said step is practiced by affixing pieces of holographic diffraction media to at least two spokes of the wheel, so that they are visible from both side faces of the wheel.

6. A spoked wheel, having a plurality of spokes, and first and second sides; and holographic diffraction media disposed in contact with at least two of said spokes, and visible from both sides of said wheel.

7. A spoked wheel as recited in claim 6 wherein said holographic diffraction media comprises pieces of thin polyester holographic film with an adhesive backing; and wherein two pieces of said film are disposed in adhesive back-to-back contact with each other with at least two spokes sandwiched therebetween, one piece visible on each side of said wheel.

8. A method of enhancing the visibility to humans of a spoked wheel having two side faces, comprising the step of fixing pieces of holographic diffraction media to at least two spokes of the wheel, so that they are visible from both side faces of the wheel.

9. A method as recited in claim 8 wherein the holographic diffraction media comprises a thin film having an adhesive backing, and wherein said affixing step is practiced by placing the adhesive backings of two pieces of film in contact with each other with at least two spokes sandwiched therebetween.

* * * * *